US008068927B2

(12) United States Patent
Gatts

(10) Patent No.: US 8,068,927 B2
(45) **Date of Patent: *Nov. 29, 2011**

(54) CHANGING TIME INTERVALS OF THE OCCURRENCE OF AUDIO INFORMATION FROM LOCAL AND REMOTE SITES

(75) Inventor: Todd D. Gatts, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 613 days.

This patent is subject to a terminal disclaimer.

(21) Appl. No.: 12/109,090

(22) Filed: Apr. 24, 2008

(65) Prior Publication Data

US 2008/0194197 A1 Aug. 14, 2008

Related U.S. Application Data

(63) Continuation of application No. 10/661,015, filed on Sep. 12, 2003, now Pat. No. 7,376,476.

(51) Int. Cl.

| | |
|---|---|
| *G06F 17/00* | (2006.01) |
| *G06F 15/16* | (2006.01) |
| *H04B 3/00* | (2006.01) |
| *H04B 1/06* | (2006.01) |
| *H04N 7/173* | (2011.01) |
| *H04N 27/00* | (2006.01) |
| *H04N 7/20* | (2006.01) |

(52) U.S. Cl. .................. 700/94; 381/2; 381/77; 381/82; 455/242.1; 455/243.1; 725/100; 725/63; 725/86; 709/231

(58) Field of Classification Search .................... 700/94; 381/82, 77, 102–109; 455/242.1, 242.3, 455/517; 725/63–89, 97, 146; 704/500

See application file for complete search history.

(56) References Cited

U.S. PATENT DOCUMENTS

| | | | | |
|---|---|---|---|---|
| 4,882,743 | A * | 11/1989 | Mahmoud | 348/14.09 |
| 5,454,041 | A * | 9/1995 | Davis | 381/119 |
| 6,353,632 | B1 * | 3/2002 | Moeller et al. | 375/240.01 |
| 6,934,759 | B2 * | 8/2005 | Hejna, Jr. | 709/231 |
| 7,376,476 | B2 * | 5/2008 | Gatts | 700/94 |
| 2004/0180641 | A1 * | 9/2004 | Elliott et al. | 455/243.1 |
| 2008/0199022 | A1 * | 8/2008 | Gatts | 381/82 |

* cited by examiner

*Primary Examiner* — Devona Faulk

(74) *Attorney, Agent, or Firm* — Yudell Isidore Ng Russell PLLC

(57) ABSTRACT

A method of processing audio information for broadcast to an audience can include changing first audio information from occurring in a first time interval to occurring in a second time interval to provide time-changed audio information. The time-changed audio information can be combined with second audio information that is responsive to the first audio information to provide broadcast audio information.

2 Claims, 7 Drawing Sheets

CHANGING TIME INTERVALS OF THE OCCURRENCE OF AUDIO INFORMATION FROM LOCAL AND REMOTE SITES

PRIORITY CLAIM

The present application is a continuation of U.S. patent application Ser. No. 10/661,015, filed on Sep. 12, 2003, now U.S. Pat. No. 7,376,476 and entitled, "Methods for Changing Time Intervals of the Occurrence of Audio Information from Local and Remote Sites," which is incorporated herein by reference.

BACKGROUND OF THE INVENTION

1. Technical Field

The invention generally relates to the field of information processing and, more particularly, to methods, systems, and computer program products for processing audio information.

2. Description of the Related Art

It is known that momentary periods of silence exist during normal conversations. For example, in a question and answer session, there is usually a period of silence that occurs between the end of a question the answer provided thereto. Furthermore, periods of silence can also occur during normal conversation between two or more parties. Accordingly, this momentary silence is more or less expected is normal situations.

It is also known that in some situations (which fall outside the realm of a normal conversation) unusually long periods of silence can be introduced where otherwise normal periods of silence would occur. For example, when a conversation is occurring over a great distance, such as via a satellite link, the propagation delay associated with the transmission of audio from a local site to a remote site coupled with the propagation of audio information from the remote site back to the local site can introduce such long periods of silence. These long periods of silence during the conversation can become awkward and unproductive as the participants may be unsure as to how long to wait before speaking again.

It is known to address the situation discussed above by recording an entire conversation in a medium which can allow "off-line" editing to reduce the amount of silence present in the conversation. For example, a question and answer session conducted by via satellite can be recorded on audiotape whereupon the recording can be edited to reduce any silence between the questions and answers. However, this approach may not be feasible when the session is to be carried out in real-time or near real-time.

SUMMARY OF THE INVENTION

Embodiments according to the invention can provide methods, devices, and computer program products for changing a time interval in which audio information occurs to provide time-changed audio information that can be combined with other audio information for broadcast. For example, in some embodiments according to the invention, local audio information can be broadcast over a satellite link to a remote site. The local audio information can be time-expanded so that the time interval during which the time-expanded audio occurs occupies some of the interval which would otherwise be silent due to the propagation delay of response from the remote site. When the remote audio information is received at the local site, the remote audio information can be combined with the time-expanded audio to provide audio information for broadcast to an audience. Therefore, embodiments according to the invention may allow an awkward silence that would otherwise exist in an interval between the end of the local audio and the beginning of the remote audio to be reduced to a comfortable level.

DETAILED DESCRIPTION OF THE PREFERRED EMBODIMENT

Figure 1A:
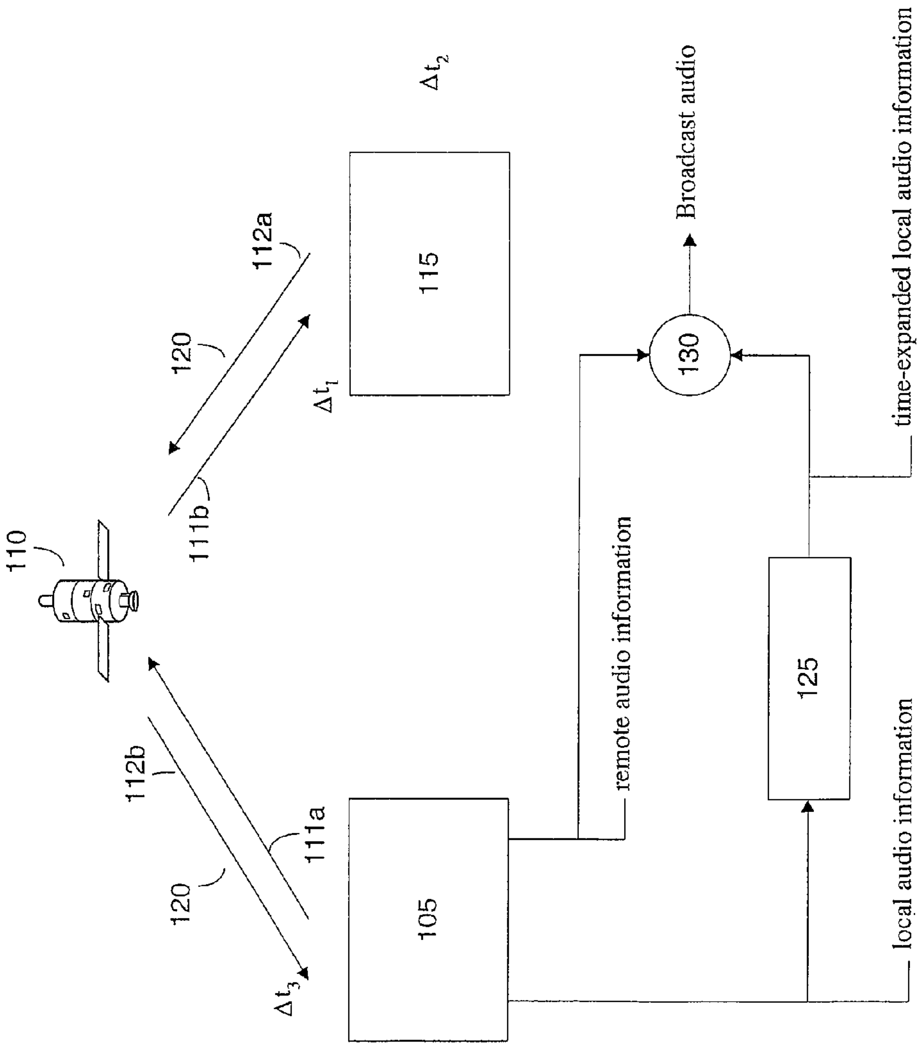
FIG. 1A is a block diagram that illustrates embodiments of methods, systems, and computer program products according to the invention.

The invention is described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers and reference designators refer to like elements throughout.

As will be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code or "code" for carrying out operations according to the present invention may be written in an object oriented programming language such as JAVA®, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

The invention is described below with reference to diagram illustrations of methods, systems and computer program products according to embodiments of the invention. It is understood that each block shown in the diagrams (i.e., block diagram and/or flowchart diagram), and combinations of blocks in the diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the diagram block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the diagram block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the diagram block or blocks.

Although the present disclosure describes the processing of local and remote audio information, it will be understood that embodiments according to the invention can be practiced utilizing video information that accompanies the local and remote audio information. Accordingly, as the audio information is time-expanded and/or compressed, the accompanying video information may also be processed to, for example, maintain synchronization between the video information and the accompanying audio information. The synchronization of audio and video information is well known in the art and is described, for example, in U.S. Pat. No. 6,249,319, by Post, entitled Method and apparatus for finding a correct synchronization point within a data stream, which is commonly assigned to the present assignee, the disclosure of which is incorporated herein in its entirety.

Embodiments according to the invention can provide methods, systems, and computer program products for changing a time interval in which audio information occurs to provide time-changed audio information that can be combined with other audio information for broadcast. For example, in some embodiments according to the invention, local audio information can be broadcast over a satellite link to a remote site. The local audio information can be time-expanded so that the time interval during which the time-expanded audio occurs occupies some of the interval which would otherwise be silent due to the propagation delay of response from the remote site. When the remote audio information is received at the local site, the remote audio information can be combined with the time-expanded audio to provide audio information for broadcast to an audience. Therefore, embodiments according to the invention may allow an awkward silence that would otherwise exist in an interval between the end of the local audio and the beginning of the remote audio to be reduced to a comfortable level.

FIG. 1A is a block diagram that illustrates embodiments of methods, systems, and computer program products according to the invention. In particular, local audio information is provided by a local site 105 and transmitted to a remote site 115 over a communications link 120, such as a satellite system 110. The local site 105 can be, for example, a broadcast studio wherein a participant, such as an interviewer, can pose questions to another participant located at the remote site 115.

The local audio information propagates to the remote site 115 via an uplink 111A and a downlink 111B associated with the satellite system 110. The local audio information provided by the local site 105 can be provided to a participant located at the remote site 115 who can, in turn, respond to a question or information provided by the local audio information.

The uplink 111A and the downlink 111B each have respective propagation delays associated therewith. In other words, the time needed for audio information to propagate from the local site 105 to the remote site 115 includes a propagation delay for the uplink 111A and a propagation delay for the downlink 111B, the total of which can be expressed by )$t_1$. It will be understood that a normal delay can exist between the time that the local audio information arrives at the remote site 115 and the time at which a response (in the form of remote audio information) is transmitted back to the local site 105, which can be expressed as )$t_2$.

In turn, remote audio information is transmitted from the remote site 115 to the local site 105 over the satellite system 110. The remote audio information is provided to the local site 105 over an uplink 112A and a downlink 112B, each of which has an associated propagation delay, the total of which can be expressed as )$t_3$. Accordingly, the "round trip" propagation delay associated with the local audio information and the response thereto, in the form of the remote audio information, can be expressed as:

$$)t_1+)t_2+)t_3.$$

It will be understood that the components of the propagation delay included in )$t_1$ and )$t_3$ can, if unprocessed, introduce awkward silence into the interaction between participants at the local site 105 and the remote site 115.

According to embodiments of the invention, the local audio information transmitted to the remote site 115 is also provided to a processor circuit 125 which can change the time interval over which the local audio information normally occurs. For example, in some embodiments according to the invention, the processor circuit 125 expands the time interval in which the local audio information occurs such that a time-expanded audio information occupies at least a portion of an awkward silence which may otherwise exist between unprocessed local audio information and the remote audio information. The time-expansion of audio information is well known in the art and is described, for example, in U.S. Pat. No. 6,353,632, to Moeller et al., entitled Video processing system with real time program duration compression and expansion, the disclosure of which is incorporated herein in its entirety.

The time-expanded audio information is combined with the remote audio information by a combiner circuit 130 to provide broadcast audio which can be provided to an audience. Accordingly, from the perspective of the broadcast audience, the awkward silence may be reduced or eliminated, thereby adjusting the interaction between the local participant and the remote participant to have a more natural appearance to the broadcast audience.

Figure 1B:
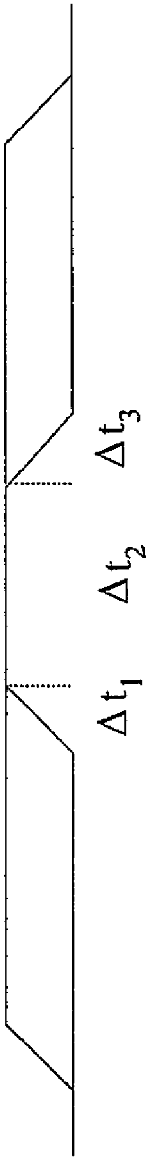
FIG. 1B is a schematic timing diagram that represents propagation delay associated with transmissions between local and remote sites.
Figure 1C:
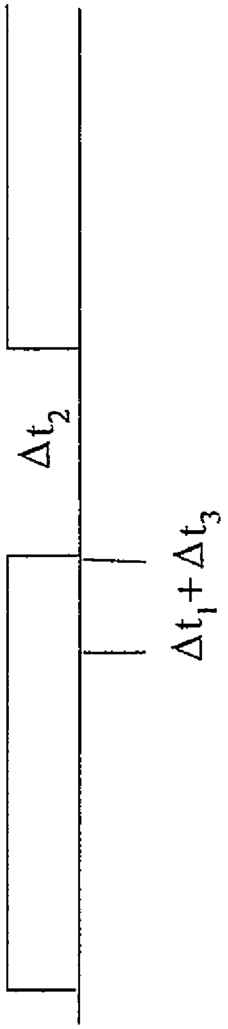
FIG. 1C is a schematic timing diagram that illustrates broadcast audio that can be provided by methods, systems, and computer program products according to the invention.

FIGS. 1B and 1C are schematic timing diagrams that illustrate differences between unprocessed audio information, which may include awkward periods of silence, and processed audio information according to the invention. In particular, FIG. 1B illustrates local audio information provided to the remote site 115. The propagation delay associated with the transmission of the local audio information to the remote site 115 is represented by )$t_1$ in FIG. 1B. The time internal )$t_2$ represents the time taken by the participant at remote site 115 to provide a response to the local audio information in the form of the remote information transmitted back to the local site 105. The propagation delay associated with the remote audio information is represented by the time interval )$t_3$ in FIG. 1B.

Accordingly, the total time interval observed by the participant at the local site 105 from the transmission of the local audio information to the reception of the remote audio information at the local site 105 is represented by )$t_1$+)$t_2$+)$t_3$. As discussed above, it will be understood that the time interval )$t_2$ can represent a normal interval of silence that is expected to occur between a question or request to a participant and the response provided thereto.

As shown in FIG. 1C, broadcast audio information includes time-expanded audio information that is expanded to occupy at least a portion of the time interval associated with the propagation delay of the local audio information to the remote site 115 and the propagation delay associated with the transmission of the remote audio information from the remote site 115 to the local site 105. In particular, the time-expanded audio information is shown as occurring during a time interval that is greater than the interval in which the unprocessed local audio information occurs in FIG. 1B, which is expressed as )$t_1$+)$t_3$ in FIG. 1C. Furthermore, as shown in FIG. 1C, the expected silent time interval represented by )$t_2$ is preserved in the broadcast audio such that the broadcast audience may perceive a normal period of delay in the interaction between the participants that may otherwise not exist in the unprocessed audio information.

The broadcast audio further includes the remote audio information that is provided by the participant at the remote site 115. It will also be understood that although the term “silence” is used herein to describe a time interval (or delay) between a question or request and a response thereto. It will be understood that this time interval may include other audio information which is not responsive to a question or request included in the local audio information. For example, the time interval can include background noise or other ambient sounds which may be introduced into the broadcast audio from another source or provided by the remote site 115 or the local site 105 as part of the remote or local audio information.

Figure 2:
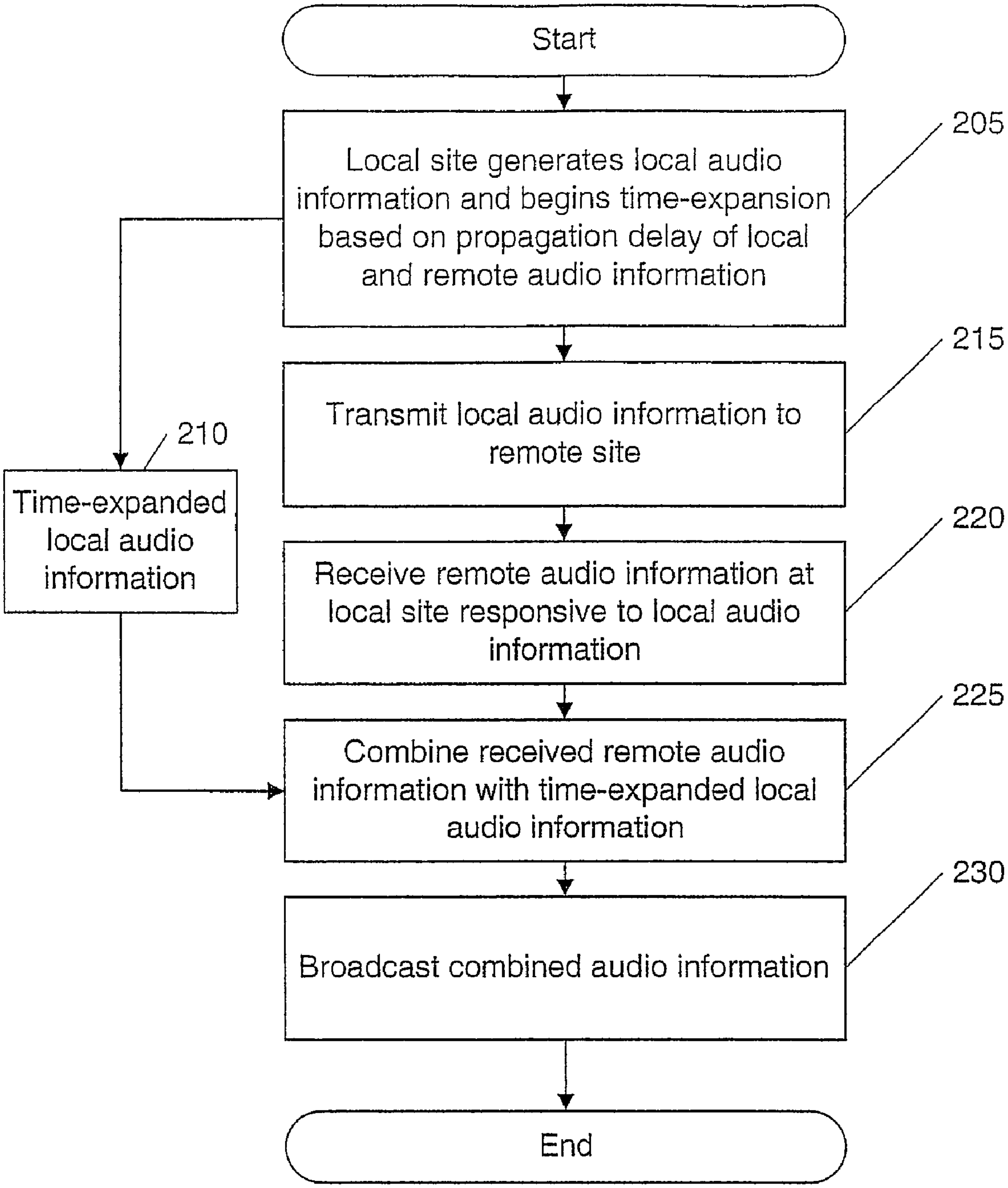
FIG. 2 is a flowchart that illustrates operations of embodiments of methods, systems, and computer program products according to the invention.

FIG. 2 is a flowchart that illustrates the operations of embodiments of methods, systems, and computer program products according to the invention. In particular, the local site generates local audio information (block 205) which is time expanded based on a delay associated with the propagation of the local audio information the remote audio information (block 210). For example, the propagation delay associated with the transmission of the local and remote audio information can be based on actual measurements or estimates of the propagation delay imposed by the communications link over which the local and remote audio information are transmitted. Furthermore, it will be understood that the delay associated with the propagation of local and remote audio information can be initially estimated and otherwise measured on an ongoing basis as the audio information is actually transmitted and received. Accordingly, the delay on which the time-expansion is based can change as conditions associated with the communications link change. For example, the satellite position may change over time thereby introducing more or less propagation delay which can cause a corresponding increase or decrease in the time interval over which the local audio information is expanded.

The local audio information is transmitted to the remote site via the communications link (block 215). After a propagation delay )$t_1$, the local audio information is received at the remote site. A participant at the remote site can provide a response to the received local audio information as the remote audio information. The remote audio information is transmitted from the remote site to the local site via the communications link (block 220) thereby experiencing a corresponding propagation delay )$t_3$.

The time-expanded local audio information (Block 210) is combined with the remote audio information received at the local site to provide combined audio information (block 225). The combined audio information is broadcast to an audience which may not include participants at the local and remote sites (Block 230).

It will be understood that the local audio information and the remote audio information may be transmitted by over communications links each having an associated propagation delay and/or basis for estimating the delay associate therewith. For example, the local audio information may be transmitted to the remote site over a land line whereas the remote audio information can be transmitted to the local site via a wireless communications link such as the satellite link described above. It will be understood that other types of wireless links having associated propagation delays associated therewith can also be used. Moreover, different types of land lines having different propagation delays may also be used.

Figure 3A:
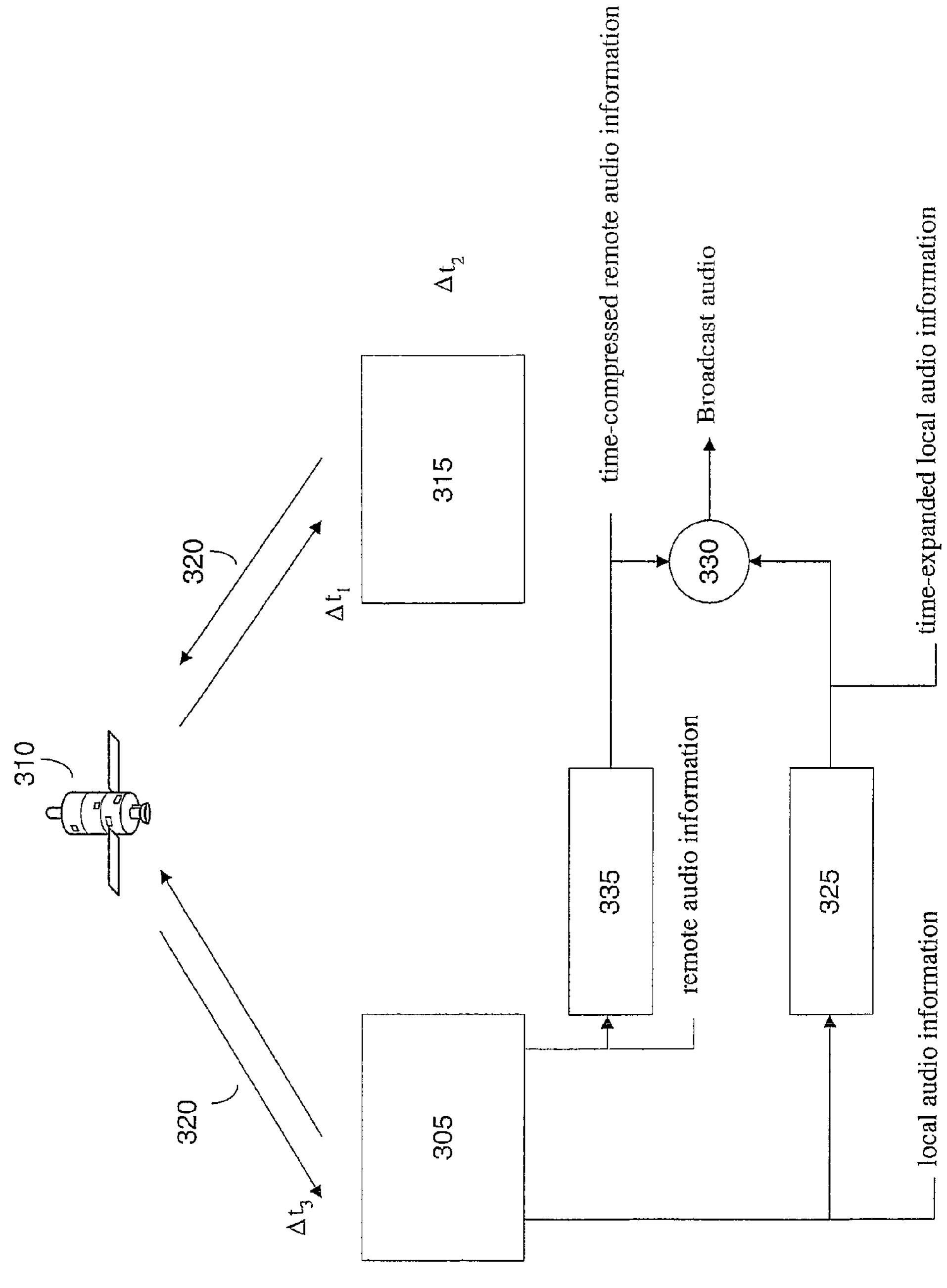
FIG. 3A is a block diagram that illustrates embodiments of methods, systems, and computer program products according to the invention.

FIG. 3A is a block diagram that illustrates embodiments of methods, systems, and computer program products according to the invention. In particular, a local site 305 produces local audio information which is transmitted to a remote site 315 over a communications link 320 provided by a satellite communication system 310. It will be understood that even though a communications link 320 is shown as including an uplink and downlink portion, it will be understood that the communications link can include other components such as land line segments and other types of systems that may cause propagation delay in addition to the uplink and downlink portions.

As the local audio information is provided by the local site 305, the local audio information is time-expanded, by a processor circuit 325, to occupy a time interval that is greater than a time interval in which the local audio information would otherwise occur to provide time-expanded audio information as the local audio information is generated.

As discussed above, the local audio information is transmitted to the remote site 315, which provides the remote audio information to the local site 305 after the delay )$t_1$+)$t_2$+)$t_3$. The local site 305 provides the received remote audio information to a processor circuit 335 that time-compresses the remote audio information to occur in a time interval that is less than a time interval in which the remote audio information would otherwise occur. The processor circuit 335 operates to provide time-compressed remote audio information responsive to a determination that the local audio and the remote information occur during an overlapping time interval. The time-compressed remote audio information and the time-expanded local audio information are combined by a combiner circuit 330 to produce broadcast audio.

Figure 3B:
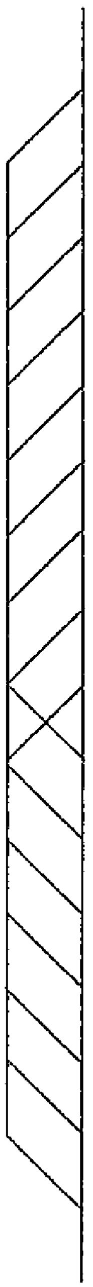
FIG. 3B is a schematic timing diagram that illustrates situations where audio from local and remote sites occur in an overlapping time interval.

FIG. 3B is a schematic timing diagram that illustrates local and remote audio information that occur during an overlapping time interval. In particular, according to FIG. 3B, local audio information is provided by the local site 305 to the remote site 315. In turn, the remote audio information is provided to the local site 305. In some cases, the participants can begin talking "over" one another such that the local and remote audio information occur during the overlapping time interval, such as when a local participant and a remote participant become confused because of the propagation delay associated with the communications link 320.

Figure 3C:
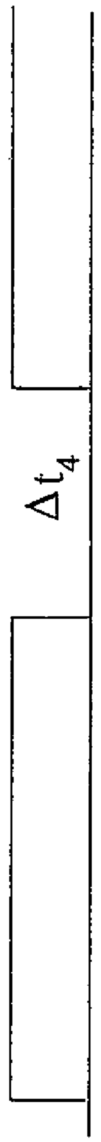
FIG. 3C is a schematic timing diagram that illustrates broadcast audio information that includes time-expanded and time-compressed audio information according to the invention.

FIG. 3C is a schematic timing diagram that illustrates broadcast audio including time-expanded local audio information combined with time-compressed remote audio information to provide the broadcast audio information. In particular, time-expanded audio information is provided by the time expansion circuit 325 until a time )$t_1$ wherein it is determined that remote audio information is also being received at the same time. Accordingly, the processor circuit 325 ceases the time-expansion of the local audio information, whereas the processor circuit 335 begins providing time-compressed remote audio information so as to introduce a time interval )$t_4$ between the time-expanded local audio information and the time-compressed remote audio information. The time compressed remote audio information and the time expanded local audio information are combined to provide the broadcast audio which can provide the broadcast audience with the perception that a natural delay exists between the local audio information and the remote audio information.

Figure 4:
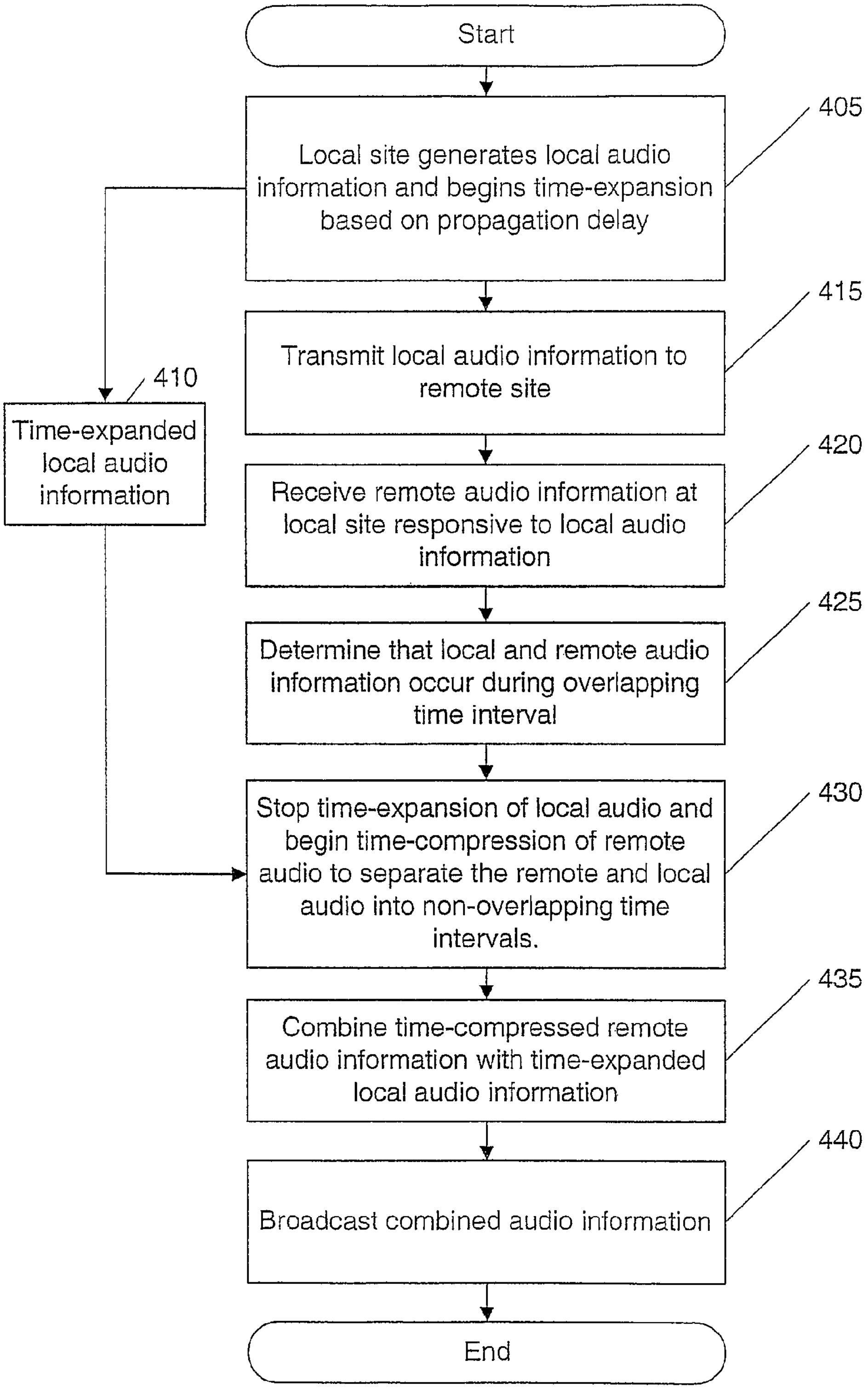
FIG. 4 is a flowchart that illustrates operations of embodiments of methods, systems, and computer program products according to the invention.

FIG. 4 is a flowchart that illustrates operations of embodiments of methods, systems, and computer program products according to the invention. In particular, the local site generates local audio information which is time expanded to occur in a time interval that is based on a delay associated with the propagation local and remote audio information (block 405). The local audio information is transmitted from the local site to the remote site (block 415). The remote site transmits remote audio information to the local site 305 after a time interval )$t_2$, which can be a delay that is normally observed between a question and an answer thereto. The remote audio information is received at the local site 305 after a propagation delay )$t_3$ (block 420).

A determination is made that the local and remote audio information occur during an overlapping time interval (block 425). Such an occurrence can be a situation where participants at the local site 305 and at the remote site 350 appear to be talking over one another which can be due in part to the unusually long time delay between a question and answer introduced by the propagation delays )$t_1$ and )$t_3$. Upon determining that the local audio information and the remote audio information are occurring during the overlapping time interval, time-expansion of the local audio information (block 410) is ceased, whereas time-compression of the remote audio information begins (block 430).

The time-compression of the remote audio information coupled with the ceased time-expansion of the local audio information can provide a delay between the local and remote audio information that is expected by a broadcast audience. The local audio information (both the time-expanded local audio information and the unexpanded local audio information) are combined with time-compressed remote audio information to provide the broadcast audio (block 435). The combined audio information can be broadcast to an audience (block 440) which can reduce the time period which participants at local and remote sites would otherwise perceive as talking over one another.

Figure 5:
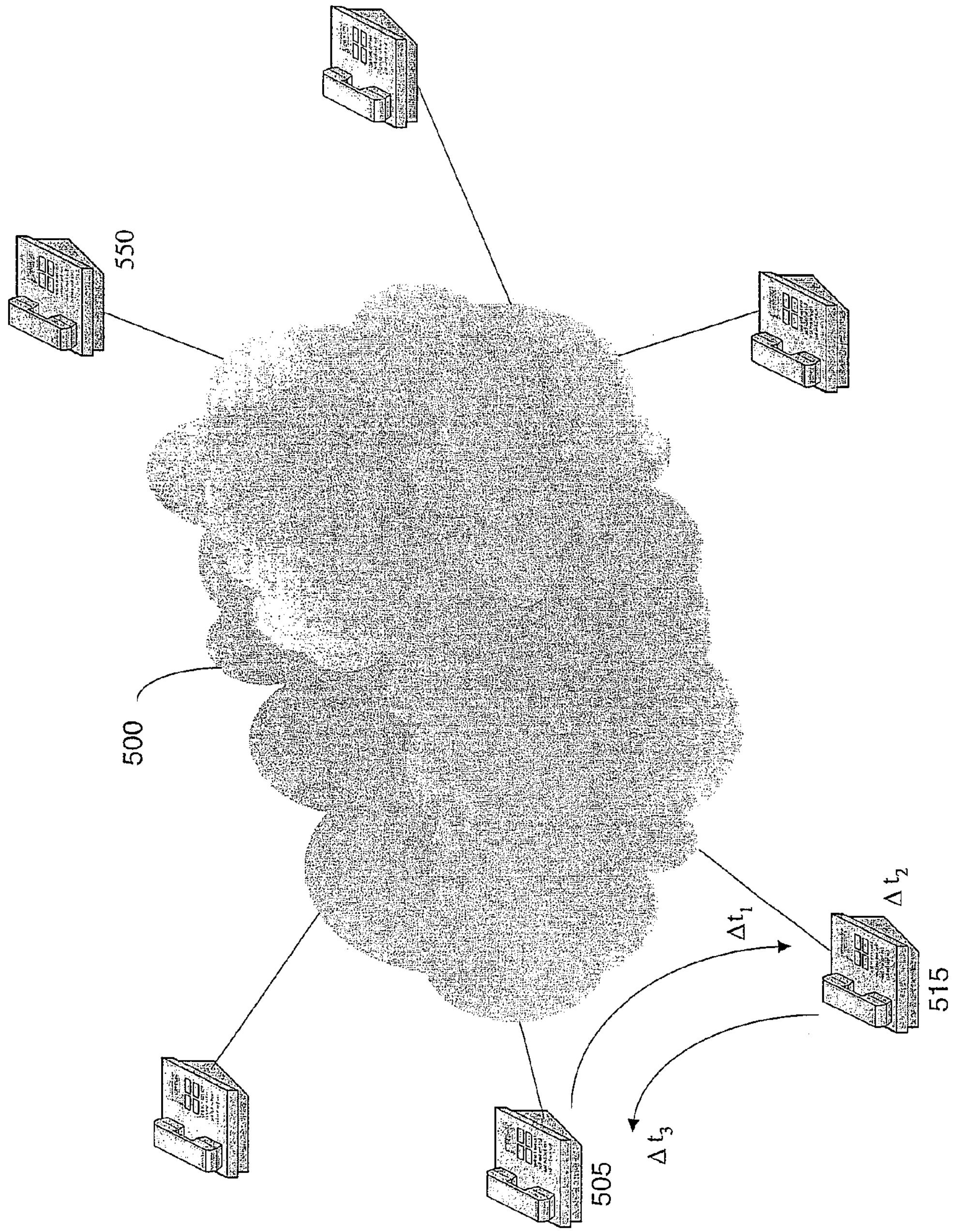
FIG. 5 is a schematic representation of a network over which communications can occur according to the invention.

FIG. 5 is a block diagram that illustrates embodiments of methods, systems, and computer program products according to the invention. In particular, a local site 505 and a remote site 515 are connected via a network 500. Participants at the local site 505 and at the remote site 515 can communicate with one another, such as during a conference call. It will be understood that other participants can function as the broadcast audience.

As disclosed above, local audio information is transmitted from the local site 505 to the remote site 515 experiencing a propagation delay )$t_1$. Remote audio information is transmitted from the remote site 515 to the local site 505 experiencing a propagation delay )$t_3$. It will be understood that the remote audio information can be transmitted responsive to the reception of the local audio information after a delay which is normally expected to occur between reception of the local audio information and the transmission of the remote audio information. The local audio information and the remote audio information can be transmitted using a protocol known as Voice Over IP (VOIP). VOIP is well known in the art and is described, for example, in U.S. Pat. No. 6,421,424, entitled, Client simulator and method of operation for testing PSTN-to-IP network telephone services for individual & group internet clients prior to availability of the services, which is commonly assigned to the present assignee, the disclosure of which is incorporated herein in its entirety.

Accordingly, the respective propagation delays associated with the local audio information and remote audio information can be different from one another and, moreover, can change over time. Therefore, the propagation delay )$t_1$ associated with the local audio information can be different than the propagation delay )$t_3$ associated with the remote audio information at a first time, whereas later the propagation delays may be equal to one another. Accordingly, the delay used as the basis for the time-expansion or time-compression may change dynamically as communication occurs between the local site 505 and the remote site 515. It will be understood that embodiments according to the invention can be utilized, for example, in telephone handsets that may be used to provide conference calling functions. Alternatively, embodiments according to the invention can be utilized, for example, at least partially as part of a communications network that users may access to utilize the conference call features.

It will be understood that the propagation delays associated with the local and remote audio information can be provided by conventional techniques used to provide a certain quality of service to users of the network 500. Quality of service techniques are well known in the art and are described, for example, in U.S. Pat. No. 5,694,548, entitled, System and method for providing multimedia quality of service sessions in a communications network, which is commonly assigned to the present assignee, the disclosure of which is incorporated herein in its entirety. Quality of service is not discussed further herein.

It will also be understood that the other participants (described above as members of the broadcast audience) may join the conversation with the local and remote sites 505, 515, and thereby become participants. Accordingly, it will be understood that the definition of which of the participants represents the local site 505 and the remote site 515 may change. For example, initially, the local site 505 and the remote site 515 may be the sole participants in a conference call. Later, a third site 550 may begin communicating with the local and remote sites 505, 515.

Moreover, audio information communicated to and from the third site 550, having respective propagation delays associated therewith, can also be processed according to embodiments of the invention. For example, if the propagation delays associated with the third site 550 are determined to introduce an awkward delay into the communication, the associated audio information can be processed to time-expand the respective local audio information provided by the third site 550 and/or time-compress the remote audio information provided to the third site 550 as described above in detail.

As discussed above, embodiments according to the invention can provide methods, systems, and computer program products for changing a time interval in which audio information occurs to provide time-changed audio information that can be combined with other audio information for broadcast. For example, in some embodiments according to the invention, local audio information can be broadcast over a satellite link to a remote site. The local audio information can be time-expanded so that the time interval during which the time-expanded audio occurs occupies some of the interval which would otherwise be silent due to the propagation delay of response from the remote site. When the remote audio information is received at the local site, the remote audio information can be combined with the time-expanded audio to provide audio information for broadcast to an audience. Therefore, embodiments according to the invention may allow an awkward silence that would otherwise exist in an interval between the end of the local audio and the beginning of the remote audio to be reduced to a comfortable level.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. An electronic communication device for processing audio information broadcast to an audience, the device comprising:

a processor circuit configured to change first audio information from occurring in a first time interval to occurring in a second time interval to provide time-changed audio information; and a combiner circuit configured to combine the time-changed audio information with second audio information that is responsive to the first audio information to provide broadcast audio information wherein a difference between the first time interval and the second time interval is based on a delay between a transmission time at which the first audio information is transmitted from a source to a destination and a reception time at which the first audio information is received at the destination.

2. An electronic communication device for processing audio information broadcast to an audience, the device comprising:

a processor circuit configured to change first audio information from occurring in a first time interval to occurring in a second time interval to provide time-changed audio information; and a combiner circuit configured to combine the time-changed audio information with second audio information that is responsive to the first audio information to provide broadcast audio information wherein a difference between the first time interval and the second time interval is based on a delay between a transmission time at which the second audio information is transmitted from a source to a destination and a reception time at which the second audio information is received at the destination.

* * * * *